(12) United States Patent
Katzbach

(10) Patent No.: US 12,234,184 B2
(45) Date of Patent: Feb. 25, 2025

(54) ENAMEL COATING OF A COATED GLASS SUBSTRATE

(71) Applicant: Fenzi AGT Netherlands B.V., Maastricht (NL)

(72) Inventor: Roland Katzbach, Maastricht (NL)

(73) Assignee: Fenzi AGT Netherlands B.V., Maastricht (NL)

( * ) Notice: Subject to any disclaimer, the term of this patent is extended or adjusted under 35 U.S.C. 154(b) by 373 days.

(21) Appl. No.: 17/615,448

(22) PCT Filed: Jul. 15, 2020

(86) PCT No.: PCT/GB2020/051697
§ 371 (c)(1),
(2) Date: Nov. 30, 2021

(87) PCT Pub. No.: WO2021/023965
PCT Pub. Date: Feb. 11, 2021

(65) Prior Publication Data
US 2022/0227661 A1    Jul. 21, 2022

(30) Foreign Application Priority Data

Aug. 8, 2019   (GB) .................................. 1911367

(51) Int. Cl.
| | | |
|---|---|---|
| *C03C 8/04* | (2006.01) | |
| *C03C 3/145* | (2006.01) | |
| *C03C 3/15* | (2006.01) | |
| *C03C 4/02* | (2006.01) | |
| *C03C 8/08* | (2006.01) | |
| *C03C 8/16* | (2006.01) | |
| *C03C 17/04* | (2006.01) | |

(52) U.S. Cl.
CPC .............. *C03C 8/04* (2013.01); *C03C 3/145* (2013.01); *C03C 3/15* (2013.01); *C03C 4/02* (2013.01); *C03C 8/08* (2013.01); *C03C 8/16* (2013.01); *C03C 17/04* (2013.01); *C03C 2204/00* (2013.01); *C03C 2207/00* (2013.01); *C03C 2218/119* (2013.01); *C03C 2218/32* (2013.01)

(58) Field of Classification Search
CPC .. C03C 8/04; C03C 3/145; C03C 3/15; C03C 4/02; C03C 8/08; C03C 8/16; C03C 17/04; C03C 2204/00; C03C 2207/00; C03C 2218/119; C03C 2218/32
See application file for complete search history.

(56) References Cited

U.S. PATENT DOCUMENTS

| | | |
|---|---|---|
| 5,252,521 A | 10/1993 | Roberts |
| 5,306,674 A | 4/1994 | Ruderer et al. |
| 2008/0090034 A1 | 4/2008 | Harrison et al. |
| 2017/0016270 A1 | 1/2017 | Kayaba et al. |

FOREIGN PATENT DOCUMENTS

| | | |
|---|---|---|
| CN | 1453232 A | 11/2003 |
| CN | 103534218 A | 1/2014 |
| CN | 107523117 A | 12/2017 |
| EP | 1361199 A1 | 11/2003 |
| JP | 2004284934 A | 10/2004 |
| JP | 2010083748 A | 4/2010 |
| JP | 2017197426 A | 11/2017 |
| TW | 379332 B | 1/2000 |
| TW | 201029946 A1 | 8/2010 |
| WO | 2014/133929 A2 | 9/2014 |

*Primary Examiner* — Robert S Walters, Jr.
(74) *Attorney, Agent, or Firm* — BakerHostetler

(57) ABSTRACT

This disclosure concerns a method of decorating a glass substrate having a coating, the method comprising: applying a paste onto at least a portion of the coating in a desired pattern; drying the paste to form a dried paste in the desired pattern; and firing the dried paste to form an enamel in the desired pattern, the enamel being directly bonded to the glass substrate by dissolution of the portion of the coating to which the paste is applied during the firing step. The paste comprises a solids portion dispersed in a dispersion medium, the solids portion including a composition comprising: 10 to 40 mol % ZnO; 20 to 40 mol % $B_2O_3$; 25 to 65 mol % $Bi_2O_3$, $TeO_2$, or PbO, or mixtures thereof; and to 15 mol % $Al_2O_3$.

15 Claims, No Drawings

ENAMEL COATING OF A COATED GLASS SUBSTRATE

FIELD OF THE INVENTION

The present invention relates to enamel coating of a glass substrate having a coating, for example, architectural or automotive glass comprising a coating such as an inorganic optical coating.

BACKGROUND

Glass substrates used in, for example, architectural and automotive applications are increasingly coated with thin, multilayer stacks. These multilayer stacks typically comprise numerous thin films (typically <100 nm each) which are planar, homogeneous, transparent in the visible spectrum and provide a desired functionality to the glass substrate. This functionality can be, for example, near-infrared (NIR) reflection or electrical conductance to heat the transparent substrate.

These multilayer coatings typically comprise a precisely controlled sequence of materials, designed to give the overall desired effect (see H. Bach and D. Krause, Thin Films on Glass, Springer, 1997 and H. Angus Macleod, Thin film and optical filters, CRC Press, 2017). These materials may include high refractive dielectric materials (e.g. $TiO_2$, $Nb_2O_5$, $ZrO_2$), low refractive dielectric materials (e.g. $Si_3N_4$, $SiO_2$, ZnO) and metallic interlayers (e.g. Ag, Au).

In certain applications it may be desired to decorate or cover part of a glass substrate with an enamel, for instance an obscuration enamel applied on the edge of the substrate to protect an underlying adhesive from UV degradation. Such enamels usually derive from glass-pigment compositions which, in general, are applied to a glass substrate as dispersions in an organic phase using a printing method. The organic phase is typically then removed in a thermal step. The printed compositions are fused at a suitable temperature, typically between 400 to 700° C., which results in an enamel having a permanent and stable bond with the glass substrate.

Conventional commercially available enamels are not suitable for decorating coated glass substrates as these enamels are not able to completely etch the multilayer coating, thereby leading to undesirable defects such as discoloration, lack of adhesion, delamination and loss of coating functionality. Conventional enamels can only be used for decorating coated glass substrates if the coating is first chemically or mechanically removed from the area where the enamel is to be applied, enabling the enamel to fuse directly with the bare glass substrate. This process is both costly and can lead to quality defects.

WO2014/133929 discloses an alternative method wherein the coating underneath the printed area is dissolved during the firing step such that the enamel can form a direct bond with the glass substrate. There is, however, no disclosure in WO2014/133929 regarding the types of compositions that might be employed in such a method.

There is thus a need for enamel-forming compositions which provide good processing on various coated glass substrates and result in decorated coated glass articles having a good balance of properties. In particular, there is a need for enamel-forming compositions wherein the enamel's reactivity in the required firing range is sufficient to completely dissolve or react with the underlying coatings and which form good colours, provide good chemical durability and provide good glass strength.

SUMMARY OF THE INVENTION

The present specification described compositions for decorating a glass substrate having a coating, said compositions comprising:
  10 to 40 mol % ZnO;
  20 to 40 mol % $B_2O_3$;
  25 to 65 mol % $Bi_2O_3$, $TeO_2$, or PbO, or mixtures thereof; and
  0.1 to 15 mol % $Al_2O_3$.

The present specification also describes pastes for decorating a glass substrate having a coating, said pastes comprising a solids portion dispersed in a dispersion medium, said solids portion comprising a composition as hereinbefore described.

The present specification also describes a method of preparing a paste comprising mixing in any order:
  (a) a composition as hereinbefore described; and
  (b) a dispersion medium.

The present specification also describes a method of decorating a glass substrate having a coating, said method comprising:
  (i) applying a paste as hereinbefore described onto at least a portion of said coating in a desired pattern;
  (ii) drying said paste to form a dried paste in said desired pattern; and
  (iii) firing said dried paste to form an enamel in said desired pattern, said enamel being directly bonded to said glass substrate.

The present specification provides a coated glass substrate having an enamel formed on at least a portion thereof, obtainable or obtained by a method as hereinbefore described.

DETAILED DESCRIPTION

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

Where ranges are specified herein it is intended that each endpoint of the range is independent. Accordingly, it is expressly contemplated that each recited upper endpoint of a range is independently combinable with each recited lower endpoint, and vice versa.

The compositions described herein are given as mole percentages. These mole percentages are the mole percentages of the components used as starting materials in preparation of the compositions, on an oxide basis. As the skilled person will understand, starting materials other than oxides of a specific element may be used in preparing the compositions of the present invention. Where a non-oxide starting material is used to supply an oxide of a particular element to the composition, an appropriate amount of starting material is used to supply an equivalent molar quantity of the element had the oxide of that element been supplied at the recited mol %. This approach to defining compositions, in particular glass frit compositions, is typical in the art. As the skilled person will readily understand, volatile species (such as oxygen) may be lost during the manufacturing process of the compositions, and so the final compositions may not correspond exactly to the mole percentages of starting materials, which are given herein on an oxide basis. Analysis of a fired composition by a process known to those skilled in the art, such as Inductively Coupled Plasma Emission Spectroscopy (ICP-ES), can be used to calculate the starting components of the composition in question.

As used herein, the term "enamel" is intended to mean a material which results from subjecting a paste of the present invention, which has been applied to at least a portion of a glass substrate having a coating, to a firing step (e.g. preferably at a temperature of 400 to 750° C.).

As used herein, the term "paste" is intended to cover both a paste (e.g. as used in a screen printing method) and an ink (e.g. as used in an inkjet printing method).

The present specification provides a composition suitable for decorating a glass substrate having a coating, for example, architectural or automotive glass. The compositions are suitable for decorating any kind of glass substrate having a coating. The coating on a glass substrate to be decorated can be of varying thickness, but typically has a thickness ranging from 50 to 300 nm. The coating typically comprises one or more thin films, which have been sequentially deposited on the glass substrate (e.g. by physical vapour deposition (PVD) etc.). These films may include high refractive dielectric materials (e.g. $TiO_2$, $Nb_2O_5$, $ZrO_2$), low refractive dielectric materials (e.g. $Si_3N_4$, $SiO_2$, ZnO) and/or metallic interlayers (e.g. Ag, Au). Representative examples of coated glasses include ClimaGuard (manufactured by Guardian) and Silverstar (manufactured by Glas Trösch). The coated glass substrates to be decorated using the compositions, pastes and methods as described herein can be flat (e.g. sheet glass) or shaped (e.g. curved glass).

The compositions of the present specification comprise:
  10 to 40 mol % ZnO;
  20 to 40 mol % $B_2O_3$;
  25 to 65 mol % $Bi_2O_3$, $TeO_2$, or PbO, or mixtures thereof; and
  0.1 to 15 mol % $Al_2O_3$.

It has been found that the compositions of this specification display a good balance of properties when used to decorate a glass substrate having a coating, such as those described above. This is because the compositions are low melting (e.g. they preferably melt at temperatures of 400 to 750° C., more preferably at temperatures of 620 to 720° C.), meaning that they can dissolve the coating on a glass substrate after having been applied to the coating (e.g. in the form of a paste) and fired. This results in a strong and direct bond between the resultant enamel and the glass substrate. Furthermore, the resultant enamel has a good appearance (e.g. it is smooth and does not contain bubbles) and a good colour depth (e.g. it is dark in colour). As such, the resultant enamel has an aesthetically pleasing appearance and has good functional performance to act as an obscuration enamel and provide UV protection to, for example, underlying adhesives that may be used to attach the glass substrate to a building or automobile. A low firing temperature for the compositions is also beneficial to prevent damage or distortion to the non-printed part of the coated glass substrate.

The compositions of the present specification comprise 10 to 40 mol % ZnO. Preferably, the compositions comprise 15 to 35 mol % ZnO, more preferably 20 to 30 mol % ZnO, and even more preferably 20 to 25 mol % ZnO (e.g. 23.3 mol % ZnO).

The compositions of the present specification comprise 20 to 40 mol % $B_2O_3$. Preferably, the compositions of comprise 20 to 35 mol % $B_2O_3$, more preferably 20 to 30 mol % $B_2O_3$, and even more preferably 24 to 28 mol % $B_2O_3$ (e.g. 26 mol % $B_2O_3$).

The compositions of the present specification comprise 25 to 65 mol % $Bi_2O_3$, $TeO_2$, or PbO, or mixtures thereof. Preferably, the compositions comprise 35 to 65 mol % $Bi_2O_3$, $TeO_2$, or PbO, or mixtures thereof, 40 to 60 mol % $Bi_2O_3$, $TeO_2$, or PbO, or mixtures thereof, more preferably 40 to 50 mol % $Bi_2O_3$, $TeO_2$, or PbO, or mixtures thereof, and even more preferably 40 to 45 mol % $Bi_2O_3$, $TeO_2$, or PbO, or mixtures thereof (e.g. 43.7 mol % $Bi_2O_3$, $TeO_2$, or PbO, or mixtures thereof).

Preferably, the compositions of the present specification comprise 25 to 65 mol % $Bi_2O_3$, more preferably 35 to 65 mol % $Bi_2O_3$, even more preferably 40 to 60 mol % $Bi_2O_3$, even more preferably 40 to 50 mol % $Bi_2O_3$, and even more preferably 40 to 45 mol % $Bi_2O_3$ (e.g. 43.7 mol % $Bi_2O_3$).

Preferably, the compositions of the present specification comprise 25 to 65 mol % $TeO_2$, more preferably 30 to 55 mol % $TeO_2$, even more preferably 40 to 50 mol % $TeO_2$, and even more preferably 40 to 45 mol % $TeO_2$.

Preferably, the compositions of the present specification comprise 25 to 65 mol % PbO, more preferably 30 to 55 mol % PbO, even more preferably 40 to 50 mol % PbO, and even more preferably 40 to 45 mol % PbO.

Optionally, the compositions of the present specification comprise mixtures of $Bi_2O_3$, $TeO_2$, and/or PbO.

The compositions of the present specification comprise 0.1 to 15 mol % $Al_2O_3$. Preferably, the compositions comprise 0.5 to 14 mol %, more preferably 1.0 to 13.5 mol %, more preferably 1.5 to 12 mol %, more preferably 2.0 to 10 mol %, more preferably 3.0 to 9.5 mol %, more preferably 4.5 to 8.5 mol % $Al_2O_3$, more preferably 6.0 to 8.0 mol % $Al_2O_3$, more preferably 6.5 to 7.5 mol % $Al_2O_3$, and even more preferably 6.8 to 7.2 mol % $Al_2O_3$ (e.g. 7.0 mol % $Al_2O_3$).

Compositions comprising greater than 15 mol % $Al_2O_3$ could not be prepared. This is because above this amount of $Al_2O_3$, the $Al_2O_3$ becomes immiscible with the $Bi_2O_3$/$TeO_2$/ PbO—$B_2O_3$—ZnO matrix, leading to phase separation (at least for the compositions which were investigated).

The presence of $Al_2O_3$ in the compositions in the amounts indicated above suppresses crystallisation during the firing step, which can otherwise have a negative impact on enamel appearance, colour depth, optical density and glass strength. In the case of coated glass substrates having complex coatings, such as multilayer coatings (e.g. 10 or more individual sputtered layers), it has been found that the presence of $Al_2O_3$ is particularly important to achieving a smooth enamel surface. With regard to glass strength, the presence of $Al_2O_3$ is able to able to reduce tensions between the enamel and glass substrate by providing a smaller thermal expansion mismatch therebetween (see examples).

Optionally, the compositions of the present specification comprise a molar ratio of $Bi_2O_3$/$B_2O_3$ in a range 1.5:1 to 2.5:1. The compositions may optionally comprise a molar ratio of $Bi_2O_3$/ZnO in a range 1.4:1 to 3.7:1.

Preferably, the compositions of the present specification further comprise one or more alkali metal oxides, for example one or more compounds selected from $Li_2O$, $Na_2O$, $K_2O$, and $Rb_2O$, preferably one or more selected from $Li_2O$, $Na_2O$ and $K_2O$. The compositions may further comprise 0 to 10 mol %, preferably 0 to 5 mol %, more preferably 0 to 2 mol % of one or more alkali metal oxides.

Preferably, the compositions of the present specification further comprise $CeO_2$. The compositions may further comprise 0 to 2.0 mol %, preferably 0 to 1.0 mol %, more preferably 0 to 0.5 mol % of $CeO_2$.

The compositions of the present specification may further comprise one or more compounds selected from alkali earth metal oxides and $SnO_2$, for example one or more compounds selected from MgO, CaO, SrO, and $SnO_2$. The compositions may further comprise 0 to 10 mol %, preferably 0 to 5 mol %, more preferably 0 to 2 mol % of one or more compounds selected from alkali earth metal oxides and $SnO_2$.

The compositions of the present specification may further comprise $SiO_2$. It has been found, however, that the presence of large amounts of $SiO_2$ (i.e. >10 mol %) in compositions of the type disclosed herein causes complications during the firing step and can lead to rough enamel surfaces. This has been found to be particularly the case for coated glass substrates having complex coatings (e.g. with a high $Si_3N_4$ content and/or a multilayer coating such as 10 or more individual layers). Without wishing to be bound by theory, it is thought that $SiO_2$ promotes undesired crystallisation during the dissolution of the coating on the glass substrate, thereby inhibiting sufficient flow of the compositions at the firing temperature. Thus, in some examples, the compositions of the present specification may further comprise 0 to 10 mol %, preferably 0 to 7 mol %, more preferably 0 to 5 mol %, more preferably 0 to 2 mol % of $SiO_2$, and optionally substantially no $SiO_2$. The compositions of the present specification may be substantially free of certain components. As used herein, the term "substantially free of" in relation to a composition means that the composition has a total content of the recited component of less than or equal to 1 mol %. As will be readily understood by the skilled person, during manufacture of, for example, glass frit particles, the glass composition may be contaminated with low levels of impurities. For example, in a melt/quench glass forming process, such impurities may derive from refractory linings of vessels employed in the melting step. Thus, whilst a total absence of a particular component may be desirable, in practice this may be difficult to achieve. As used herein, the term "no intentionally added X", where X is a particular component, means that no raw material was employed in the manufacture of the composition which was intended to deliver X to the final enamel composition, and the presence of any low levels of X in the composition is due to contamination during manufacture.

Due to toxicity concerns, the use of lead-containing compounds in the compositions of the present specification may be undesirable. Thus, in preferred compositions, the compositions are substantially lead-free. As used herein, the term "substantially lead-free" is intended to include compositions which contain no intentionally added lead. For example, the composition may comprise less than 0.5 mol % PbO, less than 0.1 mol % PbO, less than 0.05 mol % PbO, less than 0.01 mol % PbO or less than 0.005 mol % PbO.

In preferred compositions of the present specification, the compositions are substantially free of fluorine. As used herein, the term "substantially fluorine-free" is intended to include compositions which contain no intentionally added fluorine. For example, the composition may comprise less than 0.5 mol % fluorine, less than 0.1 mol % fluorine, less than 0.05 mol % fluorine, less than 0.01 mol % fluorine or less than 0.005 mol % fluorine.

In preferred compositions of the present specification, the compositions are substantially free of titanium. As used herein, the term "substantially titanium-free" is intended to include compositions which contain no intentionally added titanium. For example, the composition may comprise less than 1.0 mol % $TiO_2$, less than 0.5 mol % $TiO_2$, less than 0.1 mol % $TiO_2$, less than 0.05 mol % $TiO_2$ or less than 0.01 mol % $TiO_2$.

In preferred compositions of the present specification, the compositions are substantially free of manganese. As used herein, the term "substantially manganese-free" is intended to include compositions which contain no intentionally added manganese. For example, the composition may comprise less than 1.0 mol % $MnO_2$, less than 0.5 mol % $MnO_2$, less than 0.1 mol % $MnO_2$, less than 0.05 mol % $MnO_2$ or less than 0.01 mol % $MnO_2$.

In preferred compositions of the present specification, the compositions are substantially free of tungsten. As used herein, the term "substantially tungsten-free" is intended to include compositions which contain no intentionally added tungsten. For example, the composition may comprise less than 1.0 mol % $WO_3$, less than 0.5 mol % $WO_3$, less than 0.1 mol % $WO_3$, less than 0.05 mol % $WO_3$ or less than 0.01 mol % $WO_3$.

The compositions of the present specification preferably consist essentially of a composition as described herein, and incidental impurities (such as impurities picked up during manufacture of the composition). In that case, as the skilled person will readily understand that the total mol % of the recited constituents will be 100 mol %, any balance being incidental impurities. Preferably, any incidental impurity will be present at 1 mol % or less, more preferably 0.5 mol % or less, even more preferably 0.2 mol % or less.

For example, preferred compositions of the present specification consist essentially of:
(i) 10 to 40 mol % ZnO;
(ii) 20 to 40 mol % $B_2O_3$;
(iii) 25 to 65 mol % $Bi_2O_3$, $TeO_2$, or PbO, or mixtures thereof;
(iv) 0.1 to 15 mol % $Al_2O_3$;
(v) 0 to 10 mol % of one or more compounds selected from $Li_2O$, $Na_2O$, and $K_2O$;
(vi) 0 to 10 mol % of one or more compounds selected from MgO, CaO, SrO, and $SnO_2$;
(vii) 0 to 2 mol % $CeO_2$;
(viii) 0 to 10 mol % $SiO_2$; and
(ix) incidental impurities.

A particularly preferred composition of the present specification consists essentially of:
(i) 20 to 25 mol % ZnO (e.g. 23.3 mol % ZnO);
(ii) 24 to 28 mol % $B_2O_3$ (e.g. 26.0 mol % $B_2O_3$);
(iii) 40 to 45 mol % $Bi_2O_3$ (e.g. 43.7 mol % $Bi_2O_3$);
(iv) 6.0 to 8.0 mol % $Al_2O_3$ (e.g. 7.0 mol % $Al_2O_3$); and
(v) incidental impurities.

The optimum D90 particle size of the compositions described herein depends upon the method that is to be used to apply the composition to a coated glass substrate.

For certain applications (e.g. screen printing), the compositions of the present specification preferably have a D90 particle size of less than 30 microns. In some examples, the particles of the composition may have a D90 particle size of 5 to 20 microns, preferably 7 to 14 microns, more preferably 12 to 13 microns.

For certain applications (e.g. inkjet printing), the compositions of the present specification preferably have a D90 particle size of less than or equal to 1.5 microns or less than or equal to 1.0 micron (optionally, no less than 0.1 microns). In some examples, the particles of the composition may have a D90 particle size of 0.6 to 1.5 microns, 0.7 to 1.2 microns, or 0.8 to 1.0 microns.

The term "D90 particle size" herein refers to particle size distribution, and a value for D90 particle size corresponds to the particle size value below which 90%, by volume, of the total particles in a particular sample lie. The D90 particle size may be determined using a laser diffraction method (e.g. using a Malvern Mastersizer 2000).

The optimum D50 particle size of the compositions described herein depends upon the method that is to be used to apply the composition to a coated glass substrate.

For certain applications (e.g. screen printing), the compositions of the present specification preferably have a D50 particle size of less than 20 microns. In some examples, the particles of the composition may have a D50 particle size of 3 to 15 microns, preferably 5 to 10 microns, more preferably 6 to 7 microns.

For certain applications (e.g. inkjet printing), the compositions of the present specification preferably have a D50 particle size of less than or equal to 1.0 microns. In some examples, the particles of the composition may have a D50 particle size of 0.1 to 1.0 micron, 0.3 to 0.9 microns, 0.4 to 0.7 microns, or 0.45 to 0.6 microns.

The term "D50 particle size" herein refers to particle size distribution, and a value for D50 particle size corresponds to the particle size value below which 50%, by volume, of the total particles in a particular sample lie. The D50 particle size may be determined using a laser diffraction method (e.g. using a Malvern Mastersizer 2000).

For certain applications (e.g. screen printing), the compositions of the present specification preferably have a maximum particle size of less than 50, 30, 25, or 20 microns. In some examples, the particles of the composition may have a maximum particle size of 10 to 50 microns.

For certain applications (e.g. inkjet printing), the compositions of the present specification preferably have a maximum particle size of less than 2.0, 1.5, or 1.0 microns. In some examples, the particles of the composition may have a maximum particle size of 0.5 to 2 microns.

For ink-jet printing applications, inks can be prepared to have a low viscosity, for example 15 to 25 mPas (milli pascal seconds) at a shear rate of $100 \, s^{-1}$. In such compositions the solid powder content is low, for example between 30 and 55%.

Screen printing pastes have a higher viscosity, for example 12 to 15 Pas at $10 \, s^{-1}$ and 8 to 10 Pas at $100 \, s^{-1}$. The solid powder content is higher, for example 75 to 85%. And for compositions as described here even 90% or more solid content in the paste is possible.

Preferably, the coefficient of thermal expansion (CTE) of the compositions of the present specification is close to the CTE of the glass substrate having a coating. Thus, the compositions of the present specification preferably have a CTE which is less than or equal to $120 \times 10^{-7}$/K, more preferably less than or equal to $115 \times 10^{-7}$/K, even more preferably less than or equal to $110 \times 10^{-7}$/K even more preferably less than or equal to $108 \times 10^{-7}$/K as measured using a dilatometer. A suitable dilatometer is a DIL803 Dual Sample Dilatometer, which is available from TA Instruments. During firing the coating can be at least partially dissolved in the enamel further lowering the CTE of the enamel towards $90 \times 10^{-7}$/K, e.g. by take up of ZnO and/or $SiO_2$ which shifts the CTE of the enamel to lower values. Thus, the stress between the enamel and the glass substrate can be reduced.

In preferred compositions of the present specification, this composition is a powder. Preferably, the composition is a fusible material having the recited composition, or a mixture of one or more fusible materials which together provide the recited composition. The compositions can be totally amorphous, partially crystalline or totally crystalline material. Preferably, the composition is a crystalline compound. Preferably, the composition is a glass frit. Alternatively, the composition is a sintered material.

In preferred compositions, the composition is a glass frit. Glass frit compositions may be prepared by mixing together the required raw materials and melting them to form a molten glass melt, then quenching to form a glass frit. The process may further comprise milling the resulting glass to provide glass frit particles of the desired particle size. For example, the glass may be milled using a jet-milling process, a ball milling process or a bead-milling process, such as wet bead-milling in an alcohol-based, a glycol-based or a water-based solvent. The skilled person is aware of alternative suitable methods for preparing glass frit. Suitable alternative methods include water quenching, sol-gel processes and spray pyrolysis.

The glass frit compositions preferably have a dilatometric softening point temperature ($T_s$) in the range 360 to 400° C. For example, the glass frit compositions may have a $T_s$ in the range in the range 360 to 380° C.

As used herein, the term "softening point", or "$T_s$," means the first temperature at which indications of softening or deformation of a glass are observed, as measured using a dilatometer.

The glass frit compositions preferably have a glass transition temperature ($T_g$) in the range 330 to 400° C. or 350 to 400° C. For example, the glass frit compositions may have a $T_g$ in the range 350 to 390° C.

As used herein, the term "glass transition temperature", or "$T_g$," means the glass transition temperature as measured according to the ASTM E1356 "Standard Test Method for Assignment of the Glass Transition Temperature by Differential Scanning calorimetry".

The compositions as described herein can be formed into an enamel paste.

The pastes of the present specification are suitable for decorating a glass substrate having a coating. The pastes comprise a solids portion dispersed in a dispersion medium, said solids portion comprising a composition as hereinbefore described. Preferably, the solids portion further comprises a pigment.

In preferred pastes of the present specification, the solids portion comprises 70 to 90 wt. %, more preferably 75 to 85 wt. % (e.g. 83 wt. %) of a composition as hereinbefore described, and 10 to 30 wt. % pigment, more preferably 15 to 25 wt % pigment (e.g. 17 wt %), based on the total weight of the solids portion. Such pastes are particularly suitable for application to a coated glass substrate using screen-printing methods but can also be used for inkjet printing.

In preferred pastes, the paste comprises 75 to 95 wt %, more preferably 80 to 90 wt % (e.g. 85% wt) of a solids portion and 5 to 25% wt, more preferably 10 to 20% wt (e.g. 15 wt %) of a dispersion medium. Such pastes are particularly suitable for application to a coated glass substrate using screen-printing methods.

In preferred pastes, the paste comprises 35 to 55 wt %, more preferably 40 to 50 wt % (e.g. 45% wt) of a solids portion and 45 to 65% wt, more preferably 50 to 60% wt (e.g. 55 wt %) of a dispersion medium. Such pastes are particularly suitable for application to a coated glass substrate using inkjet printing methods.

The pastes of the present specification may be applied to a glass substrate having a coating (e.g. via printing) in order to deposit the composition onto the uppermost surface of the coating of the glass substrate. As used herein, the term "uppermost surface" refers to the surface of the coating that is not in direct contact with the glass substrate.

As used herein, the term "dispersion medium" refers to a substance which is in the liquid phase at the conditions intended for application of the paste to a glass substrate (i.e. printing conditions). Thus, at ambient conditions the dispersion medium may be solid or a liquid too viscous for printing. As the skilled person will readily understand, combination of the compositions of the present invention and a pigment with a dispersion medium to form the paste may take place at elevated temperature if required.

The dispersion medium to be employed in the pastes of the present specification may be selected on the basis of the intended method of applying the paste to a substrate. Typically, the dispersion medium comprises an organic liquid.

In examples, the dispersion medium adequately suspends the particle mixture at application conditions, and is removed completely during drying of the applied paste and/or firing of the deposited particle mixture. Factors influencing the choice of medium include solvent viscosity, evaporation rate, surface tension, odour and toxicity. Suitable mediums preferably exhibit non-Newtonian behavior at printing conditions. Suitably, the medium comprises one or more of water, alcohols, glycol ethers, lactates, glycol ether acetates, aldehydes, ketones, aromatic hydrocarbons and oils. Mixtures of two or more dispersion mediums are also suitable.

The pastes preferably further comprise one or more supplementary materials. These may include dispersants, binders, resins, viscosity/rheology modifiers, wetting agents, thickeners, thixotropes, stabilisers and surfactants.

In preferred pastes, the solids portion further comprises a pigment. Mixtures of two or more pigments are also suitable. Preferred pigments include black spinel type pigments.

The pastes are preferably substantially lead-free, that is, any lead-containing components are substantially absent from the paste. For example, the paste may comprise less than 0.1 wt. % lead.

The pastes are preferably substantially fluorine-free, that is, any fluorine-containing components are substantially absent from the paste. For example, the paste may comprise less than 0.1 wt. % fluorine.

In some applications, e.g. automotive glass applications, it is advantageous for the paste to impart non-stick properties to the resultant enamel. This is because in these applications it is often necessary to bend the glass substrate after the firing process is complete (e.g. to form a car windscreen etc.). If the enamel does not have non-stick properties, processing problems are often encountered during the bending process. Such non-stick properties can be achieved by incorporating an additive material into the pastes. Accordingly, in preferred pastes, the solids portion further comprises an additive material. Preferably, the solids portion comprises 3 to 10 wt %, 4 to 10 wt %, 5 to 10 wt %, or 5 to 8 wt % (e.g. 8 wt %) of an additive material, based upon the total weight of the solids portion. Preferably, the additive material is a glass frit composition, (e.g. a bismuth silicate glass frit). Alternatively, the additive material is a crystalline compound or a filler material (e.g. alumina, magnesia, zirconia, zircon, cordierite or fused silica). Preferably, the additive material further comprises a seed material (e.g. a crystal seed material). More preferably, the additive material further comprises 0.2 to 4 wt % or 1 to 3 wt % (e.g. 2 wt %) of a seed material, based upon the total weight of the solids portion.

The pastes of the present specification may be prepared by mixing in any order:
(a) a composition as hereinbefore described; and
(b) a dispersion medium.

In some examples, the pastes may be prepared by mixing in any order:
(a) a composition as hereinbefore described;
(b) a pigment; and
(c) a dispersion medium.

In some examples, the pastes may be prepared by mixing in any order:
(a) a composition as hereinbefore described;
(b) a pigment;
(c) a dispersion medium; and
(d) an additive material.

The components may be mixed, for example, using a dissolver, a high shear mixer, or a bead-mill. In some examples, the dispersion medium and/or the combined components may be heated prior to and/or during mixing.

In some cases, it may be desirable to mill the compositions to the desired particle size after they have been combined with the dispersion medium. Suitable milling techniques include bead milling, ball milling, basket milling or other appropriate wet milling techniques.

The pastes as described herein are particularly useful in a method of decorating a glass substrate having a coating, the method comprising:
(i) applying a paste as hereinbefore described onto at least a portion of said coating in a desired pattern;
(ii) drying said paste to form a dried paste in said desired pattern; and
(iii) firing said dried paste to form an enamel in said desired pattern, said enamel being directly bonded to said glass substrate.

Deposition of the paste onto at least a portion of the coating in step (i), may be achieved by applying a layer of the paste hereinbefore described onto the portion of the coating of the substrate. The layer of paste may be applied to the coated glass substrate via a suitable printing method. For example, the layer of paste may be applied to a coated glass substrate via inkjet printing, screen printing, roller coating or by dispenser application. In a preferred method, the paste is applied to the coated glass substrate via screen printing. In an alternative preferred method, the paste is applied to the coated glass substrate via inkjet printing.

The applied layer of paste preferably has a wet layer thickness in the range 20 to 45 microns, more preferably in the range 25 to 40 microns, even more preferably in the range 30 to 35 microns. The wet layer thickness of the applied layer of paste may vary depending on the printing method used and the intended end use of the final decorated articles. For example, inkjet layers can be made thinner, e.g. 10 to 30 μm, 12 to 25 μm, or 15 to 20 μm thickness.

After application of the paste layer to a coated glass substrate and prior to firing, the applied coating undergoes a drying step (ii) for removal or partial removal of solvents present in the dispersion medium. Drying may be carried out at temperatures of up to 200° C., more preferably temperatures of up to 150° C. Drying may be carried out, for example, by air drying the applied layer at ambient temperature, by heating the paste-coated glass substrate in a suitable oven, or by exposing the paste-coated glass substrate to infrared radiation.

In step (iii), the dried pastes are fired to form an enamel, wherein the enamel is directly bonded to the glass substrate. Step (iii) causes dissolution, preferably substantially complete dissolution, of the portion of the coating to which the paste was originally applied. In this manner, the enamel directly contacts and adheres to the underlying glass substrate over substantially the entire surface area of the portion to which the paste is applied. For example, the enamel may be directly bonded to the underlying glass substrate over at least 50%, 60%, 70%, 80%, 90%, 95%, 99%, or 100% of the surface area of the portion to which the paste is applied. By "directly bonded", we mean that no discernible coating layer is disposed between the enamel and the underlying glass substrate, the coating having been dissolved away during the firing step.

The dried paste may be fired in step (iii) by heating the glass substrate with the dried paste applied thereon to a temperature sufficiently high to cause particles of the composition to soften and flow and for any remaining components deriving from the dispersion medium to be burnt off, and also to dissolve the underlying coating without provoking undesirable deformation of the glass substrate. The firing step is preferably carried out by heating the assembly to a temperature in the range 400 to 750° C., more preferably in the range 620 to 720° C. Heating the assembly may be carried out via convective heating, for example, using a suitable kiln or furnace, such as a two-chamber roller kiln or a continuous line furnace.

Preferred methods further comprise the step of:
(iv) bending the glass substrate.

The present specification also provides a coated glass substrate having an enamel formed on at least a portion thereof, obtainable or obtained by a method as hereinbefore described.

The present specification also provides the use of a composition as hereinbefore described to form a paste.

The present specification also provides the use of a paste as hereinbefore described to form an enamel on at least a portion of a glass substrate having a coating.

EXAMPLES

The invention will now be further described with reference to the following examples, which are illustrative, but not limiting of the invention.

Materials

Glass frits and sintered compositions were prepared using commercially available raw materials.

Example 1: Preparation of Bi—B—Zn-Based Oxide Compositions and Pastes

Table 1 gives examples of glass frit compositions. The raw materials for the frits were mixed and melted in a ceramic crucible in an electrical kiln. The kiln was heated up with a ramp of 30° C./min and held at a peak temperature of 850 to 950° C. for 15 to 20 minutes. After this time, the glass melt was found to be homogeneous and was then quenched in water. The glass frit was then dried at 120° C. in a drying cabinet. After drying, the glass frit was ground using a jet mill (an Alpine-Hosokawa pico jet mill 40 AFG) to a particle size of D(50)=6 to 7 μm and D(90)=12 to 13 μm.

TABLE 1

Frit compositions in mol % and their coefficient of thermal expansion (CTE) in $10^{-7}$ $K^{-1}$

| Components | molar % Example No | | | | | | | | |
|---|---|---|---|---|---|---|---|---|---|
| | 1 | 2 | 3 | 4 | 5 | 6 | 7 | 8 | 9 |
| $Bi_2O_3$ | 50.6 | 47 | 44.2 | 47 | 41.8 | 40.1 | 44.7 | 42.7 | 44.1 |
| $B_2O_3$ | 18.3 | 21.9 | 25.5 | 27.9 | 24.9 | 23.9 | 26.6 | 25.4 | 26.2 |
| ZnO | 30.8 | 31.1 | 30.3 | 25.1 | 22.3 | 21.4 | 23.9 | 22.7 | 23.5 |
| $SiO_2$ | | | | | 7.5 | 14.6 | | | 0.2 |
| $Al_2O_3$ | | | | | | | | 4.8 | 9.2 |
| MgO | | | | | | | | | 6 |
| MnO | | | | | | 1.7 | | | |
| BaO | | | | | | 0.7 | | | |
| $CeO_2$ | 0.3 | | | | | | | | |
| $Na_2O$ | | | | | | 1.1 | | | |
| CTE | 110 | 113 | 111 | 113 | 101 | 107 | 107 | 99 | 108 |

| Components | molar % Example no | | | | | | |
|---|---|---|---|---|---|---|---|
| | 10 | 11 | 12 | 13 | 14 | 15 | 16 |
| $Bi_2O_3$ | 44.1 | 42.7 | 41.1 | 43.7 | 56 | 46 | 43.7 |
| $B_2O_3$ | 26.3 | 25.4 | 20.6 | 26 | 28 | 27.4 | 26 |
| ZnO | 23.6 | 22.8 | 33.2 | 23.3 | 16 | 24.6 | 23.3 |
| $SiO_2$ | | 0.1 | | | | | |
| $Al_2O_3$ | | 4.5 | 5 | 7 | | 2 | |
| MgO | | 4.5 | | | | | |
| $SnO_2$ | 6 | | | | | | |
| $CeO_2$ | | | | | | | |
| $Na_2O$ | | | | | | | 7 |
| CTE | 102 | 100 | 103 | 108 | 112 | 110 | 130 |

Compositions comprising greater than 15 mol % $Al_2O_3$ could not be prepared. This is because above this amount of $Al_2O_3$, the $Al_2O_3$ becomes immiscible with the $Bi_2O_3$—$B_2O_3$—ZnO matrix, leading to phase separation.

Additionally, a sintered composition was made having the same elemental composition as frit 4 but produced by a sinter process (labelled "SP of frit 4" in table 2 below). In this process, the raw materials (here $Bi_2O_3$, $H_3BO_3$ and ZnO) were thoroughly mixed and then heat-treated in an electrical kiln at 450° C. for 3 h and subsequently at 540° C. for 9 h. The sintered product was jet-milled as described above for the glass frits.

To form a paste, the jet-milled frits were blended with a back pigment to form a solids portion (consisting of 83% wt frit and 17% wt of black pigment), which was then dispersed in a dispersion medium by triple roll milling.

Example 2: Decoration of Coated Glass Substrates

The resultant pastes were screen printed using a 77 T screen onto 6 mm thick coated glass plates (300×150×6 mm) with a wet layer thickness of 25-30 μm. The coated glass plates A, B, C and D employed in these tests are each commercially available coated glasses (A=ClimaGuard; B=SilverStar; C=SilverStar (2 Ag layers); D=Sunguard SN). The layer structure of each of these coatings (layer order starting from the glass substrate) is as follows:
- A: silicon nitride, zinc oxide, silver, nickel/chromium, tin oxide zinc oxide, silicon nitride.
- B: silicon nitride, tin oxide, zinc oxide, silver, nickel/chromium, zinc oxide, silicon nitride.
- C: order similar to B but two silver layers separated by three layers of zinc oxide, tin oxide, zinc oxide.
- D: 2× the sequence of A.

The prints were first dried at 150° C. for 15 minutes. Firing was then carried out in a two-chamber roller kiln (NBP combustion systems model Fer 2C 15 4Z-SDO) with a set temperature of 670° C. in the first chamber and 700° C. in the second chamber. The dwell time for the glass plates in each of the chambers was 160 s and 150 s, respectively.

Example 3: Test Results for Coated Glass Substrates

The resultant enamels were evaluated to determine the following properties:

(i) whether the enamel dissolves the coatings completely

A characteristic of firing enamels on coated glass is the strong temperature difference between printed (heat absorbing) and non-printed (heat reflective) areas in the firing process. As a result of this, the edges of the print have lower temperatures and the conventional enamels either cannot attack the coating at the edge of the print or can only attack it partially, and full dissolution of the coating is therefore not observed.

(ii) whether the enamel forms a smooth surface

Conventional enamels frequently cause surface defects such as rough surfaces or bubbles, or coloured reflections with a metallic sheen. The formation of bubbles indicates that the reaction between coating and enamel was not completed during the firing process. A rough surface indicates that after the reaction had occurred, the enamel became too viscous to flow and form a smooth surface.

(iii) the colour (L-value), of the enamel from the glass side

L-values were measured with an X-Rite colorimeter, with reflection excluded. Colour is measured from the glass side (reverse colour) according to the CIE $L^*a^*b^*$-system. A dark black coloured enamel, which is preferable for the applications of the present invention, demonstrates a low L value. Conversely, the observation of metallic reflections/interferences indicates that the coating is still intact and has not been properly destroyed.

(iv) the optical density (OD) at 555 nm (vis range)

OD was measured using a Gretag Macbeth D200-II transmission densitometer Preferably, a light absorption of 99.9% (OD=3) is required to protect underlying adhesives used when glass sheets are assembled in buildings or cars. However, the OD was not determined if the surface was rough and porous.

(v) whether the enamel passes the scratch resistance test (i.e. Elcometer 3092 Sclerometer pen scratch pen with a load of 16N)

The scratch resistance test, using an Elcometer 3092 Sclerometer pen scratch pen with a load of 16N, is an indicator of how strong the enamel adheres to the glass substrate. The adherence is low if the coating layer is not destroyed. The scratch test also fails if the tension between enamel and glass substrate is too high or the enamel surface is rough. Accordingly, the scratch resistance was not determined if the surface was rough and porous.

The firing results for the tested glass frit compositions/sintered material compositions are summarised in Table 2. Two known enamels, enamel AF3601 and enamel 276000, were also tested. Enamel AF3601 contains a zinc silicate glass and is used for decorating architectural glass. Enamel 27600 is a low-melting bismuth oxide-based enamel. Both enamels are commercially available from Johnson Matthey.

TABLE 2

Firing results

| | substrate | Dissolving of the coating | surface | colour L-value | OD | scratch test load: 16N |
|---|---|---|---|---|---|---|
| AF3601 | A | No | smooth, glossy | metallic reflections | 2.1 | No |
| 27600 | A | partial | rough, bubbles | inhomogeneous | not measured | No |
| frit 1 | B | yes | rough, matt | dark 5.1 | 2.7 | No |
| frit 2 | C | yes | smooth, glossy | dark 1.5 | 2.6 | Yes |
| frit 3 | C | yes | smooth, glossy | dark 1.4 | 1.8 | yes |
| frit 4 | D | yes | smooth, glossy | dark 1.2 | 2.6 | yes |

TABLE 2-continued

Firing results

| substrate | Dissolving of the coating | surface | colour L-value | OD | scratch test load: 16N |
|---|---|---|---|---|---|
| frit 5 | D | yes | rough, bubbles | dark 1.1 | not measured | not done |
| frit 6 | D | not completely | rough, bubbles | edges: metallic 1.1 | not measured | not done |
| frit 7 | D | yes | smooth, glossy | dark 0.5 | 2.7 | yes |
| frit 8 | D | yes | smooth, glossy | dark 0.4 | 3.1 | yes |
| frit 9 | D | not completely | smooth, matt | dark, edges metallic 1.4 | 3.6 | yes |
| frit 10 | D | not completely | smooth, glossy | dark edges metallic 0.8 | 3.2 | yes |
| frit 11 | D | not completely | smooth, glossy, some bubbles | dark 1.2 | 3.1 | yes |
| frit 12 | D | yes | smooth, glossy | dark 0.8 | 3.1 | yes |
| frit 13 | D | yes | smooth, glossy | dark 0.4 | 4.0 | yes |
| frit 14 | D | yes | smooth, glossy | dark 0.6 | 2.7 | yes |
| frit 15 | D | yes | smooth, glossy | dark 0.6 | 3.1 | yes |
| SP of frit 4 | D | yes | smooth glossy | dark 1.1 | 2.6 | yes |

The results show that the commercially available enamels AF3601 and 27600 were not able to destroy the coating on the glass substrates during firing. On the other hand, the enamels deriving from the compositions and pastes of the present specification have a good balance of properties, including a smooth surface and a black colour from the glass side, a low L value and a high OD, making them ideally suited to applications in the architectural and automotive glass fields. Furthermore, it is clear to see that the presence of 0.1 to 15 mol % $Al_2O_3$ in the compositions of the present invention is key to achieving the good balance of properties: examples lacking $Al_2O_3$ were found to demonstrate higher CTE values, higher L values and lower OD values. The use of a sintered material in place of a glass frit was found to produce comparable results (see results for frit 4 versus results for "SP of frit 4").

Some of the enamels were further subjected to a ring-on-ring compression test, which involves applying an increasing force to glass sheets up to the breakage point.

100×110×4 mm glass substrates were first printed with pastes having a solids portion containing either 83% wt glass frit 4 or 83% wt glass frit 13, and 17% wt black pigment, the solid portion being dispersed in a dispersion medium. Each paste was then printed to a wet layer thickness of 25 μm and dried. The dried pastes were then fired at 680° C. in a roller kiln.

The ring on ring compression test according to DIN 52 292 was carried out with a Zwick/Roell Z010 tester. Fmax is the maximum compression force applied prior to breakage. Bending stress, σ, is a physical parameter independent from the thickness of glass samples and calculated by the formula $\sigma = 1.04\, F_{max}/s^2$ where s is the thickness of the glass plates. The results are shown in Table 3 below.

TABLE 3 results of ring-on-ring compression test

| | | Glass substrate printed with enamel of glass frit 4 | Glass substrate printed with enamel of glass frit 13 |
|---|---|---|---|
| coefficient of thermal expansion (CTE) | in $K^{-1}\, 10^{-1}$ | 113 | 108 |
| max. compression force, Fmax | in N | 727 | 1174 |
| bending stress, σ | in MPa | 52 | 84 |

When pastes are subjected to firing conditions, the glass substrate experiences weakening. It is therefore desirable to reduce this weakening as much as possible. The results above show that the force required to break the glass plates rises from 727N to 1174N when the paste is changed from one comprising glass frit 4 to one comprising glass frit 13. The difference between these two glass frits is that frit 13 comprises 7.0 mol % $Al_2O_3$ whereas frit 4 does not. The presence of a small amount of $Al_2O_3$ in the compositions and pastes of the present specification, as specified hereinbefore, therefore results in decorated coated glass articles having an improved glass strength. Without wishing to be bound by theory, $Al_2O_3$ is thought to reduce tensions between the enamel and the glass substrate.

As demonstrated by these Examples, the present specification provides compositions and pastes that can be used to form enamels on coated glass substrates. During firing, the compositions can dissolve the portion of the coating to which it has been applied to form a direct bond to the glass substrate. The resultant enamels have a good balance of properties, including good colours, good chemical durability and good glass strength.

The invention claimed is:

1. A method of decorating a glass substrate having a coating, said method comprising:
   (i) applying a paste onto at least a portion of said coating in a desired pattern;
   (ii) drying said paste to form a dried paste in said desired pattern; and
   (iii) firing said dried paste to form an enamel in said desired pattern, said enamel being directly bonded to said glass substrate,
   wherein the paste comprises a solids portion dispersed in a dispersion medium, said solids portion including a composition comprising:
   15 to 35 mol % ZnO;
   20 to 30 mol % $B_2O_3$;
   40 to 50 mol % $Bi_2O_3$; and
   1.5 to 12 mol % $Al_2O_3$,
   and wherein step (iii) causes dissolution of said portion of said coating.

2. The method according to claim 1, wherein said composition comprises 2 to 10 mol % $Al_2O_3$.

3. The method according to claim 1, wherein said composition comprises 20 to 30 mol % ZnO.

4. The method according to claim 1, wherein said composition comprises 24 to 28 mol % $B_2O_3$.

5. A method according to claim 1, wherein said composition comprises 40 to 45 mol % of $Bi_2O_3$.

6. The method according to claim 1, wherein said composition further comprises 0 to 10 mol % of $SiO_2$.

7. The method according to claim 1, wherein said composition is substantially fluorine-free and/or substantially lead-free.

8. The method according to claim 1, wherein said composition further comprises 0 to 10 mol % of one or more alkali metal oxides.

9. The method according to claim 1, wherein said composition further comprises 0 to 2 mol % $CeO_2$.

10. The method according to claim 1, wherein said composition further comprises 0 to 10 mol % of one or more compounds selected from alkali earth metal oxides and $SnO_2$.

11. The method according to claim 1, wherein said composition is a glass frit.

12. The method according to claim 1, wherein the D90 particle size of the composition is 5 to 20 microns.

13. The method according to claim 1, wherein the D90 particle size of the composition is less than or equal to 1.0 micron.

14. The method according to claim 1, wherein said solids portion further comprises a pigment.

15. The method according to claim 14, wherein said solids portion comprises 70 to 90 wt % of said composition and 10 to 30 wt % pigment based on the total weight of the solids portion.

* * * * *